United States Patent Office 3,313,683
Patented Apr. 11, 1967

3,313,683
NEMATOCIDAL AND FUNGICIDAL METHODS
Harold M. Taylor, Indianapolis, Ind., assignor to Eli Lilly and Company, Indianapolis, Ind., a corporation of Indiana
No Drawing. Filed Apr. 22, 1963, Ser. No. 274,787
11 Claims. (Cl. 167—30)

This invention relates to novel nematocidal and fungicidal compositions and methods. More particularly, the invention concerns certain α-amino-α-arylacetonitriles as nematocidally and fungicidally active substances.

Nematodes are found in temperate and tropical regions in all types of soil at depths ranging up to five feet or more below the surface of the ground. It is difficult to control the nematode population, particularly in soils used for agricultural or greenhouse purposes, because of the exacting requirements for an effective nematode control agent in such uses. For example, the ideal nematocidal agent should be toxic to the nematode upon absorption or contact, and it must be essentially nontoxic to the plant life grown in the same soil. The chemical employed as a nematocide must be relatively nonvolatile and resistant to microbial degradation. In the prior art, most of the compounds have been halogenated hydrocarbons of the type used as fumigants. These compounds, although effective, damage the rootlets of many types of live plants, and have a substantial toxicity for animal life. It has been found that the compounds of the present invention overcome many of the previous difficulties and when introduced into soil infested with many types of nemas, eggs, and cysts, are effective nematocidal agents.

Co-existent with the nematocidal activity just described, is the ability of the compounds of the present invention to combat various fungi which occur in the soil and which have a deleterious effect on plants grown therein. In many instances the germination of seeds planted in soil infected with fungi is prevented entirely, and, even where germination occurs, the resulting seedlings often do not develop into healthy plants. Organisms affecting plants in this latter manner are known as seedling blight or damping-off fungi. An example is *Rhizoctonia solani*. Another fungus, *Phytophthora cinnamomi*, severely affects the roots of a large number of plants including avocado, pine, pineapple, heather, camellia, rhododendron, cinchona, chestnut, peach, yew, a number of deciduous and coniferous nursery trees, and Lawson cypress. *Fusarium oxysporum* f. *tracheiphilum* affects the vascular system of cowpeas, which are utilized for hay, soil improvement, and food in the Southeastern part of the United States, causing the plants to wilt and die. Sclerotium root rot (*Sclerotium rolfsii*) is a coarse, rapidly growing mycelium which adversely attacks many vegetable crops and sugar beets.

It is an object of this invention to provide compositions which are toxic to both nematodes and fungi, but which are nontoxic to plants and animal life. A further object is to provide novel compositions and processes which inhibit the growth of nematodes and fungi in agricultural soils.

In fulfillment of the above and other objects, the novel process of this invention comprises adding to and mixing with an agricultural soil a nematocidal and/or fungicidal amount of an α-amino-α-arylacetonitrile having the following structural formula:

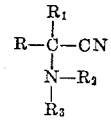

wherein R is aryl or substituted aryl; $R_1$ is hydrogen or $C_1$–$C_4$ alkyl; $R_2$, when taken separately, is hydrogen or $C_1$–$C_4$ alkyl; $R_3$, when taken separately, is hydrogen, $C_1$–$C_4$ alkyl, aryl, or substituted aryl; and $R_2$ and $R_3$, when taken together with the nitrogen atom to which they are attached, are morpholino or $C_4$–$C_5$ polymethyleneimino. Also included within the scope of this invention are acid addition salts of the compounds represented by the above formula.

In the above formula the alkyl radicals can be illustratively methyl, ethyl, n-propyl, isopropyl, n-butyl, sec.-butyl, and the like.

Aryl preferably represents a monocyclic aryl radical such as phenyl or substituted phenyl, for instance, p-chlorophenyl, o-chlorophenyl, m-chlorophenyl, p-acetamidophenyl, m-acetamidophenyl, o-acetamidophenyl, 3,4-dichlorophenyl, 3,5-dichlorophenyl, 3,6-dichlorophenyl, 2,4-dichlorophenyl, 2,5-dichlorophenyl, 2,6-dichlorophenyl, p-methoxyphenyl, o-methoxyphenyl, m-methoxyphenyl, p-tolyl, o-tolyl, m-tolyl, p-ethoxyphenyl, o-ethoxyphenyl, m-ethoxyphenyl, 3,4-diethoxyphenyl, 3,5-diethoxyphenyl, 2,4-diethoxyphenyl, 2,5-diethoxyphenyl, 2,6-diethoxyphenyl, p-bromophenyl, m-bromophenyl, o-bromophenyl, 3,4-dibromophenyl, 3,5-dibromophenyl, 3,6-dibromophenyl, 2,4-dibromophenyl, 2,5-dibromophenyl, 2,6-dibromophenyl, and the like; furyl or substituted furyl, such as 3-chlorofuryl, 4-chlorofuryl, 3-bromofuryl, 4-bromofuryl, 3-methylfuryl, 4-methylfuryl, 3-methoxyfuryl, 4-methoxyfuryl, 3-ethoxyfuryl, 4-ethoxyfuryl, and the like; thienyl or substituted thienyl, such as 3-chlorothienyl, 4-chlorothienyl, 3-methylthienyl, 4-methylthienyl, 3-methoxythienyl, 4-methoxythienyl, 3-ethoxythienyl, 4-ethoxythienyl, and the like; pyridyl or substituted pyridyl such as 2-chloropyridyl, 3-chloropyridyl, 2,6-dichloropyridyl, 2,6-dichloropyridyl, 3,5-dichloropyridyl, 2-bromopyridyl, 3-bromopyridyl, 2,6-dibromopyridyl, 2,5-dibromopyridyl, 3,5-dibromopyridyl, 2-methylpyridyl, 3-methylpyridyl, 2,5-dimethylpyridyl, 2,6-dimethylpyridyl, 3,5-dimethylpyridyl, 2-methoxypyridyl, 3-methoxypyridyl, 2,5-dimethoxypyridyl, 2,6-dimethoxypyridyl, 3,5-dimethoxypyridyl, 2-pyridyl, 3-pyridyl, 4-pyridyl, and the like.

The polymethylene imino radical can be illustratively 1-pyrrolidyl, 1-piperidyl, and the like.

The following will illustrate the acids which can be employed to form acid addition salts of the amine bases included within the scope of the above formula: hydrochloric, hydrobromic, sulfuric, nitric, phosphoric, succinic, maleic, oxalic, benzoic, tartaric, and the like.

Illustrative acetonitriles and their salts include the following compounds:

α-dimethylaminophenylacetonitrile,
α-dimethylamino-α-(4-methoxyphenyl)acetonitrile,
α-dimethylamino-α-(3-methoxyphenyl)acetonitrile,
α-dimethylamino-α-(2-chlorophenyl)acetonitrile,
α-dimethylamino-α-(4-chlorophenyl)acetonitrile, α-methylamino-2,4-dichlorophenylacetonitrile,
α-dimethylamino-4-acetamidophenylacetonitrile,
α-dimethylamino-3,4-dichlorophenylacetonitrile,
α-dimethylamino-2,6-dichlorophenylacetonitrile,
α-dimethylamino-3,4-diethoxyphenylacetonitrile,
α-dimethylamino-4-methylphenylacetonitrile,
α-morpholinophenylacetonitrile,
α-piperidinophenylacetonitrile,
α-pyrrolidino-α-(4-methoxyphenyl)acetonitrile,
α-morpholino-α-(4-methoxyphenyl)acetonitrile,
α-piperidino-α-(4-methoxyphenyl)acetonitrile,
α-dimethylamino-α-methyl-α-(4-methoxyphenyl)acetonitrile,
α-dimethylamino-4-isopropylphenylacetonitrile,
α-dimethylamino-α-isopropyl-α-(4-methoxyphenyl)acetonitrile,
α-dimehtylamino-4-hydroxyphenylacetonitrile,
α-dimethylamino-α-(n-butyl)-α-(4-methoxyphenyl)acetonitrile,
α-anilinophenylacetonitrile,
α-(p-toluidino)phenylacetonitrile,
α-(m-toluidino)phenylacetonitrile,
α-dimethylamino-α-(4-chlorophenyl)acetonitrile hydrochloride,
α-dimethylamino-α-(4-methoxyphenyl)acetonitrile hydrochloride,
α-dimethylamino-α-isopropyl-α-(4-chlorophenyl)acetonitrile,
α-(m-chloroanilino)phenylacetonitrile,
α-dimethylamino-α-(n-butyl)-α-(4-chlorophenyl)acetonitrile
α-(o-toluidino)phenylacetonitrile,
α-(N-methylanilino)phenylacetonitrile,
α-methylamino-α-(4-pyridyl)acetonitrile dihydrochloride,
α-dimethylamino-α-(3-pyridyl)acetonitrile dihydrochloride,
α-dimethylamino-α-(4-pyridyl)acetonitrile dihydrochloride,
α-dimethylamino-α-(2-thienyl)acetonitrile,
α-dimethylamino-α-(2-furyl)acetonitrile,
α-anilino-4-methoxyphenylacetonitrile,
α-amino-4-methoxyphenylacetonitrile hydrochloride,
α-(p-toluidino)-4-methoxyphenylacetonitrile,
and the like.

In general, an acetonitrile represented by the above formula, either in the from of the free base or as an acid addition salt thereof, is applied directly to the soil at the rate of from about 16 to about 512 pounds per acre. The compounds can be applied to the soil directly or they can be diluted with various inert solid or liquid diluents and then applied to the nematode- and fungus-infested area. The preferred level of application of a nematocidal acetonitrile to soils of average nematode investation is from about 16 to about 256 pounds per acre. For control of soil-inhabiting fungi, the preferred level of application of fungicidal acetonitrile is from about 32 to about 512 pounds per acre. When an acid addition salt of an acetonitrile base is used, the rate of application will, of course, depend on the amount of base actually present, since the acids which form salts with these acetonitriles bases contribute little or nothing to the nematocidal or fungicidal activity of the base, and the salts themselves are employed chiefly for ease of handling and formulating.

More specifically, the use of the acetonitrile compounds represented by the above formula as nematode control agents can be illustrated by the following procedure.

EXAMPLE 1

A test soil was prepared by thoroughly mixing two parts of white-plaster sand, two parts of masonry sand, and one part of dried loam. The resulting soil mixture was sifted through a fine screen and was dampened so that the soil crumbled and rolled readily. An amount of the acetonitrile base or acid addition salt thereof whose activity as a nematode control agent was to be evaluated, was weighed out and placed in a clean, 4-ounce jar. To the material were added 2.5 ml. of hydrated silicon dioxide as a carrier, and the test compound and carrier were mixed carefully. One hundred grams of the previously prepared soil were then added to the jar, and the jar was rolled for about 30 minutes to insure thorough mixing. Five milliliters of a nematode inoculum in the form of macerated galls and egg masses from cucumber roots infected with *Meloidogyne incognita* (Southern rootknot nematode) were added to the treated soil in the 4-ounce jar, and the jar was again shaken to distribute the inoculum. The jar was then capped and placed on a shelf in an incubated room maintained at about 78° F. After 10 days, the jar was removed from the incubator and the treated nematode-infested soil was removed from the jar and placed in a 6-ounce, wax-coated paper cup with drainage holes punched in the bottom. Five cucumber seeds were planted in the soil, which was then watered. The wax-coated paper cup was placed in a greenhouse provided with 80° F. bottom heat under fluorescent lights for a period of 14 days, watering being provided as necessary. At the end of the 7th day following planting of the seed, the cup was checked, and if no seedlings were present, five additional seeds were planted. At the end of the 24th day following the initial seeding, the seedlings were removed from the soil and their roots examined for nematode galls. Disease ratings were given according to the number of nematode galls and severity of the infection. Control jars containing no nematocide and control jars containing commercially available nematocides were also subjected to the identical test. Chart 1, which follows, gives the results of these tests. In the chart, column 1 gives the name of the compound under test; column 2, the plant disease rating at an application rate of 256 pounds per acre; and columns 3, 4, 5 and 6, the disease ratings corresponding to application rates of 128, 64, 32, and 16 pounds per acre, respecitvely. The following rating scale was employed: rating of 1—severe disease indistinguishable from the untreated control; rating of 2—moderately severe disease; rating of 3—moderate disease; rating of 4—slight disease; and rating of 5—no disease.

CHART 1

| Compound | Disease Ratings at lb./acre | | | | |
|---|---|---|---|---|---|
| | 256 | 128 | 64 | 32 | 16 |
| α-Dimethylaminophenylacetonitrile | 5 | 5 | 3 | | |
| α-Dimethylamino-α-(4-methoxyphenyl)-acetonitrile | 5 | 5 | 5 | 5 | 1 |
| α-Dimethylamino-α-(3-methoxyphenyl)-acetonitrile | 5 | 5 | 4 | 4 | 1 |
| α-Dimethylamino-α-(2-chlorophenyl)-acetonitrile | 5 | 4 | 1 | | |
| α-Dimethylamino-α-(4-chlorophenyl)-acetonitrile | 5 | 5 | 5 | | 1 |
| α-Methylamino-,4-dichlorophenylacetonitrile | 5 | 5 | 4 | 1 | 1 |
| α-Dimethylamino-4-acetamidophenylacetonitrile | 5 | 5 | 1 | 1 | 1 |
| α-Dimethylamino-3,4-dichlorophenylacetonitrile | 5 | 5 | 5 | 5 | 2 |
| α-Dimethylamino-2,6-dichlorophenylacetonitrile | 5 | 5 | 5 | 3 | 1 |
| α-Dimethylamino-3,4-diethoxyphenylacetonitrile | 5 | 5 | 1 | 1 | 1 |
| α-Dimethylamino-4-methylphenylacetonitrile | 5 | 5 | 5 | 5 | 4 |
| α-Morpholinophenylacetonitrile | 5 | 5 | 5 | 5 | 1 |
| α-Piperidinophenylacetonitrile | 5 | 5 | 1 | | |
| α-Pyrrolidino-α-(4-methoxyphenyl)-acetonitrile | 5 | 5 | 5 | 5 | 1 |
| α-Morpholino-α-(4-methoxyphenyl)-acetonitrile | 5 | 5 | 5 | 5 | 1 |
| α-Piperidino-α-(4-methoxyphenyl)-acetonitrile | 5 | 1 | 1 | | |
| α-Dimethylamino-α-methyl-α-(4-methoxyphenyl)acetonitrile | 5 | 5 | 5 | | |
| α-Dimethylamino-4-isopropylphenylacetonitrile | 5 | 5 | 5 | 5 | 4 |
| α-Dimethylamino-α-isopropyl-α-(4-methoxyphenyl)acetonitrile | 5 | 5 | 5 | 5 | 1 |
| α-Dimethylamino-4-hydroxyphenylacetonitrile | 5 | 5 | 4 | 4 | 4 |
| α-Dimethylamino-α-(n-butyl)-α-(4-methoxyphenyl)acetonitrile | 5 | 5 | 5 | 3 | 1 |

CHART 1—Continued

| Compound | Disease Ratings at lb./acre | | | | |
|---|---|---|---|---|---|
| | 256 | 128 | 64 | 32 | 16 |
| α-Anilinophenylacetonitrile | 5 | 5 | 5 | 5 | 4 |
| α-(p-Toluidino)phenylacetonitrile | 5 | 5 | 5 | 5 | 5 |
| α-(m-Toluidino)phenylacetonitrile | 5 | 5 | 1 | 1 | 1 |
| α-Dimethylamino-α-(4-chlorophenyl)-acetonitrile hydrochloride | 5 | 5 | 5 | 5 | 1 |
| α-Dimethylamino-α-(4-methoxyphenyl)-acetonitrile hydrochloride | 5 | 5 | 5 | 5 | 1 |
| α-Dimethylamino-α-isopropyl-α-(4-chlorophenyl)acetonitrile | 5 | 5 | 5 | 1 | 1 |
| α-(m-Chloroanilino)phenylacetonitrile | 5 | 5 | 1 | 1 | 1 |
| α-Dimethylamino-α-(n-butyl)-α-(4-chlorophenyl)acetonitrile | 5 | 5 | 5 | 5 | 3 |
| α-(o-Toluidino)phenylacetonitrile | 5 | 5 | 5 | 5 | 1 |
| α-(N-methylanilino)phenylacetonitrile | 5 | 5 | 5 | 3 | 1 |
| α-Methylamino-α-(4-pyridyl)acetonitrile dihydrochloride | 5 | 5 | 1 | | |
| α-Dimethylamino-α-(3-pyridyl)acetonitrile dihydrochloride | 5 | 1 | 1 | 1 | 1 |
| α-Dimethylamino-α-(4-pyridyl)acetonitrile dihydrochloride | 5 | 5 | 1 | 1 | 1 |
| α-Dimethylamino-α-(2-thienyl)acetonitrile | 5 | 5 | 5 | 5 | 1 |
| α-Dimethylamino-α-(2-furyl)acetonitrile | 5 | 5 | 5 | 3 | 2 |
| α-Anilino-4-methoxyphenylacetonitrile | 5 | 5 | 5 | 5 | 2 |
| α-Amino-4-methoxyphenylacetonitrile hydrochloride | 5 | 5 | 5 | 5 | 3 |
| α-(p-Toluidino)-α-(4-methoxyphenyl)-acetonitrile | 5 | 5 | 5 | 1 | 1 |

The soil fungicidal properties of the substituted acetonitriles of the present invention were evaluated by testing them against *Fusarium oxysporum* f. *tracheiphilum*, *Phytophthora cinnamomi*, *Rhizoctonia solani*, and *Sclerotium rolfsii*.

The general method used is described as follows.

EXAMPLE 2

Ordinary mason sand was washed with water and sterilized for 12 hours at 400° F.

Thirty milligrams of test compound were weighed out and placed in a clean, dry, 7-ounce jar. The test compound was dissolved in 0.5 ml. of ethyl alcohol, the volume brought up to 4 ml. with 0.1 percent polyoxyethylene sorbitan mono-laurate solution, 3 gm. granulated diatomaceous earth (30–60 mesh) added to the solution, and the whole mixed thoroughly. One hundred grams of sand were added to the jar, which was then rolled for about ten minutes to thoroughly mix the test compound with the sand. This gave a concentration of 300 mcg./g. or the equivalent of 512 pounds per acre of soil fungicide. The other concentrations of the test compound were prepared in a similar manner.

Each jar was inoculated with the test organism in the form of ca. 50–60 fungus-infested medium red clover seed. The jar was rolled for about 10 minutes, 10 ml. water was added to the sand, and the jar was placed in an incubator room kept at 78° F. for five days.

Under the influence of the moisture added to the sand, and the elevated temperature of the incubator room, the fungus grows, and in a control jar containing no fungicidal compound, the fungus grows sufficiently to completely cover the clover seeds with a white mycelium, easily visible through the glass of the jar. In those jars containing an effective fungicidal compound, the white mycelium surrounding the clover seed will be smaller in quantity or totally absent.

At the end of five days, the jars were examined and the fungicidal activity of the various compounds recorded as shown in Chart 2. In the chart, column 1 gives the name of the compound under test; column 2, the plant disease rating at an application rate of 256 pounds per acre; and columns 3, 4, 5, and 6 the disease ratings corresponding to application rates of 128, 64, 32, and 16 pounds per acre, respectively. The following rating scale was employed: rating of 1—severe disease indistinguishable from the untreated control; rating of 2—moderately severe disease; rating of 3—moderate disease; rating a 4—slight disease; and rating of 5—no disease.

CHART 2

| Compound | Disease Ratings at lb./acre | | | | |
|---|---|---|---|---|---|
| | 512 | 256 | 128 | 64 | 32 |
| α-Dimethylamino-α-(p-methoxyphenyl)-acetonitrile | 5 | 5 | 4 | | |
| α-Dimethylamino-4-chlorophenylacetonitrile | 5 | 5 | 1 | | |
| α-Methylamino-2,4-dichlorophenylacetonitrile | 5 | 4 | | | |
| α-Dimethylamino-2,4-dichlorophenylacetonitrile | 5 | 4 | 3 | | |
| α-Dimethylamino-4-acetamidophenylacetonitrile | 5 | 5 | 3 | | |
| α-Dimethylamino-3,4-dichlorophenylacetonitrile | 5 | 4 | 3 | | |
| α-Dimethylamino-2,6-dichlorophenylacetonitrile | 5 | 5 | 3 | | |
| α-Dimethylamino-4-methylphenylacetonitrile | 5 | 5 | 3 | | |
| α-Dimethylamino-3,4-dimethoxyphenylacetonitrile | 5 | 5 | 4 | | |
| α-Morpholinophenylacetonitrile | 5 | 5 | 4 | | |
| α-Piperidinophenylacetonitrile | 5 | 5 | 5 | 4 | 1 |
| α-Morpholino-4-methoxyphenylacetonitrile | 5 | 5 | 3 | | |
| α-Piperidino-4-methoxyphenylacetonitrile | 5 | 5 | | | |
| α-Dimethylamino-α-methyl-α-(4-methoxyphenyl)acetonitrile | 5 | 4 | | | |
| α-Dimethylamino-4-isopropylphenylacetonitrile | 5 | 5 | | | |
| α-Dimethylamino-4-hydroxyphenylacetonitrile | 5 | 5 | | | |
| α-Anilinophenylacetonitrile | 5 | 5 | 5 | 3 | 1 |
| α-Dimethylamino-4-chlorophenylacetonitrile hydrochloride | 5 | 5 | 1 | | |
| α-Dimethylamino-4-methoxyphenylacetonitrile hydrochloride | 5 | 5 | 1 | | |
| α-Dimethylamino-α-(3-pyridyl)acetonitrile dihydrochloride | 5 | 5 | 1 | | |
| α-Dimethylamino-α-(2-furyl)acetonitrile | 5 | 5 | 5 | 3 | 1 |
| α-Anilino-4-methoxyphenylacetonitrile | 5 | 5 | 1 | | |

Certain of the α-amino-α-arylacetonitriles and the salts thereof useful in the nematocidal and fungicidal processes and compositions of this invention can be prepared according to the method of Hauser et al., J. Am. Chem. Soc., 82, 1786 (1960).

The reaction of the sodium bisulfite addition product of a suitably substituted benzaldehyde with the appropriate dialkylamine and sodium cyanide in a cold ethyl alcohol solution yields the α-amino-α-arylacetonitrile.

Further substitution of the acetonitrile is accomplished by adding an ether solution of the appropriate acetonitrile to an alkali metal amide, prepared by the reaction of, for example, sodium or potassium metal with liquid ammonia. To this reaction mixture containing the alkali metal salt of the acetonitrile is added an ether solution of the appropriate alkyl halide. After the mixture has been stirred for about an hour, more ether is added and the excess ammonia allowed to evaporate. The ammonia-free ether solution is filtered, dried over magnesium sulfate, and distilled to yield the desired α-amino-α-alkyl-α-arylacetonitrile.

The following will serve to illustrate the preparation.

*Preparation 1.—α-Methylamino-2,4-dichlorophenylacetonitrile*

To a solution of 20.8 g. (0.2 mole) of sodium bisulfite in 500 ml. of water was added with stirring a solution of 35.0 g. (0.2 mole) of 2,4-dichlorobenzaldehyde in 100 ml. of ethanol. In a few minutes the bisulfite addition product precipitated. Then 15.5 g. (0.2 mole) of 40 percent aqueous methylamine solution was added, after which the reaction mixture was diluted with 200 ml. of water, and 9.8 g. (0.2 mole) of sodium cyanide was added and the reaction mixture stirred overnight at ambient room temperature.

The precipitate, containing crude α-methylamino-2,4-dichlorophenylacetonitrile, was filtered off and treated with concentrated aqueous hydrochloric acid solution, which dissolved the desired product, leaving behind the unreacted acid-insoluble starting 2,4-dichlorobenzaldehyde, which was removed by filtration.

Treatment of the aqueous acid filtrate thus obtained with concentrated aqueous ammonium hydroxide precipitated α-methylamino-2,4-dichlorophenylacetonitrile, which was recrystallized from Skellysolve B. The product weighed 18.5 g. (43 percent) and melted at about 71.5–73° C.

*Analysis.*—Calc.: C, 50.26; H, 3.75; N, 13.03. Found: C, 50.12; H, 3.66; N, 13.08.

*Preparation 2.—α-Dimethylamino-3,4-dichlorophenylacetonitrile*

By the same procedure as described in Preparation 1, but using the bisulfite addition compound of 3,4-dichlorobenzaldehyde, sodium cyanide, and 25 percent aqueous dimethylamine as the reactants, α-dimethylamino-3,4-dichlorophenylacetonitrile was obtained having a melting point of about 52.5–53° C.

*Analysis.*—Calc.: C, 52.42; H, 4.39; N, 12.23. Found: C, 52.67; H, 4.40; N, 12.00.

*Preparation 3.—α-Dimethylamino-2,6-dichlorophenylacetonitrile*

By the same procedure as described in Preparation 1 but using the bisulfite addition compound of 2,6-dichlorobenzaldehyde, sodium cyanide, and 25 percent aqueous dimethylamine as reactants, a crude liquid product was separated from the reaction mixture and distilled to yield purified α-dimethylamino-2,6-dichlorophenylacetonitrile having a boiling point of about 106–107° C./0.12 mm.; $n_D^{25}=1.5528$.

*Analysis.*—Calc.: C, 52.42; H, 4.40; N, 12.23. Found: C, 52.53; H, 4.37; N, 11.96.

*Preparation 4.—α-Dimethylamino-3,4-diethoxyphenylacetonitrile*

By the same procedure as described in Preparation 1 but using the bisulfite addition compound of 3,4-diethoxybenzaldehyde, sodium cyanide, and 25 percent aqueous dimethylamine as reactants, α-dimethylamino-3,4-diethoxyphenylacetonitrile was obtained having a melting point of about 96–97° C.

*Analysis.*—Calc.: C, 67.71; H, 8.12; N, 11.28. Found: C, 67.87; H, 8.09; N, 11.40.

*Preparation 5.—α-Dimethylamino-α-methyl-4-methoxyphenylacetonitrile*

By the same procedure as described in preparation 1 but using the bisulfide addition compound of 4-methoxybenzaldehyde, sodium cyanide, and 25 percent aqueous dimethylamine as reactants, the known compound, α-dimethylamino-4-methoxyphenylacetonitrile was prepared and used in the following synthesis.

A solution was prepared by dissolving 3.9 g. (0.1 g. atom) of potassium metal in one liter of liquid ammonia, and to this was added a solution composed of 19.0 g. (0.1 mole) of α-dimethylamino-4-methoxyphenylacetonitrile in 50 ml. of anhydrous ether. To the mixture thus obtained, 14.2 g. of methyl iodide was added as rapidly as possible with efficient stirring, continued for about half an hour. By repeatedly adding ether, stirring, and keeping the reaction at room temperature, the excess ammonia was removed by evaporation. Sufficient ether was added to effect complete solution of all solid material, and the ether solution was dried and distilled to give α-dimethylamino-α-methyl-4-methoxyphenylacetonitrile having a boiling point of about 103° C./0.4 mm.; $n_D^{25}=1.5232$.

*Analysis.*—Calc.: C, 70.55; H, 7.90; N, 13.72. Found: C, 70.92; H, 7.66; N, 13.62.

*Preparation 6.—α-Dimethylamino-α-isopropyl-4-methoxyphenylacetonitrile*

By the same procedure as described in Preparation 5 using α-dimethylamino-4-methoxyphenylacetonitrile and isopropyl bromide as reactants, α-dimethylamino-α-isopropyl-4-methoxyphenylacetonitrile was obtained as a liquid which boiled at about 122–123° C./0.37 mm.; $n_D^{25}=1.5250$.

*Analysis.*—Calc.: C, 72.37; H, 8.68; N, 12.06. Found: C, 73.44; H, 8.89; N, 11.84.

*Preparation 7.—α-Dimethylamino-α-(n-butyl)-4-methoxyphenylacetonitrile*

By the same procedure as described in Preparation 5 using n-butyl bromide and α-dimethylamino-4-methoxyphenylacetonitrile as reactants, α-dimethylamino-α-(n-butyl)-4-methoxyphenylacetonitrile was obtained as a liquid which boiled at about 132–135° C./0.3–0.5 mm.; $n_D^{25}=1.5115–1.5119$.

*Analysis.*—Calc.: C, 73.13; H, 9.00; N, 11.37. Found: C, 73.23; H, 8.89; N, 11.36.

*Preparation 8.—α-Dimethylamino-α-isopropyl-4-chlorophenylacetonitrile*

By the same procedure as described in Preparation 1, but using the bisulfite addition compound of p-chlorobenzaldehyde, 25 percent aqueous dimethylamine, and sodium cyanide as reactants, α-dimethylamino-4-chlorophenylacetonitrile was prepared.

By the same procedure as described in Preparation 5 using α-dimethylamino-4-chlorophenylacetonitrile and isopropyl bromide as principal reactants, α-dimethylamino-α-isopropyl-4-chlorophenylacetonitrile was obtained as a liquid which boiled at about 97.5–100.5° C./0.35 mm.; $n_D^{25}=1.5270$.

*Analysis.*—Calc.: C, 65.95; H, 7.24; N, 11.84. Found: C, 66.24; H, 7.07; N, 11.53.

*Preparation 9.—α-Dimethylamino-α-(n-butyl)-4-chlorophenylacetonitrile*

By the same procedure as described in Preparation 5 using α-dimethylamino-4-chlorophenylacetonitrile and n-butyl bromide as principal reactants, α-dimethylamino-α-(n-butyl)-4-chlorophenylacetonitrile was obtained as a liquid which boiled at about 118.5–119.5° C./0.55–0.6 mm.; $n_D^{25}=1.5198$.

*Analysis.*—Calc.: C, 67.05; H, 7.64; N, 11.17. Found: C, 67.26; H, 7.40; N, 11.39.

*Preparation 10.—α-Dimethylamino-3-methoxyphenylacetonitrile*

By the same procedure as described in Preparation 1, but using the bisulfite addition product of m-methoxybenzaldehyde, sodium cyanide, and 25 percent aqueous dimethylamine as reactants, α-dimethylamino-3-methoxyphenylacetonitrile was obtained as a liquid having a boiling point of about 102° C./0.65 mm.; $n_D^{25}=1.5187$.

*Analysis.*—Calc.: C, 69.44; H, 7.41; N, 14.73. Found: C, 69.71; H, 7.58; N, 14.84

*Preparation 11.—α-Dimethylamino-α-(2-furyl)acetonitrile*

By the same procedure as described in Preparation 1, but using the bisulfite addition product of furfural, sodium cyanide, and 25 percent aqueous dimethylamine as reactants, α-dimethylamino-α-(2-furyl)acetonitrile was obtained as a liquid having a boiling point of about 92° C./10 mm.; $n_D^{25}=1.4731$.

*Analysis.*—Calc.: C, 63.98; H, 6.71; N, 18.66. Found: C, 63.58; H, 7.03; N, 18.59.

*Preparation 12.—α-(p-Toluidino)-4-methoxyphenylacetonitrile*

By the same procedure as described in Preparation 1, but using the bisulfite addition product of 4-methoxybenzaldehyde, sodium cyanide, and p-toluidine as reactants, α-(p-toluidino)-4-methoxypenylacetonitrile was obtained as a solid having a melting point of about 102–103.5° C.

*Analysis.*—Calc.: C, 76.16; H, 6.39; N, 11.10. Found: C, 76.19; H, 6.60; N, 10.51.

Preparation 13.—α-Dimethylamino-α-(2-thienyl)acetonitrile

By the same procedure as described in Preparation 1, but using the bisulfite addition product of 2-thiophenecarboxaldehyde, sodium cyanide, and 40 percent aqueous dimethylamine as reactants, α-dimethylamino-α-(2-thienyl)acetonitrile was obtained as a liquid having a boiling point about 107–108° C./10 mm.; $n_D^{25}=1.5228$.

*Analysis.*—Calc.: C, 57.80; H, 6.60; N, 16.85. Found: C, 57.60; H, 6.02; N, 16.73.

Other compounds falling within the scope of this invention can be prepared according to the method of Bucherer et al., Ber., 39, 986 (1906).

A mixture of an aromatic primary or secondary amine is heated with the cyanohydrin of an aromatic aldehyde for a period of time, after which the cooled, crude product is purified by recrystallization.

Such a preparation is illustrated by the following.

Preparation 14.—α-Anilinophenylacetonitrile

A mixture of 40.0 (0.3) mole of benzaldehyde cyanohydrin and 28.0 g. (0.3 mole) of analine was heated at about 130° C. for about two hours. The reaction mixture containing the crude product solidified when cooled. The crude α-anilinophenylacetonitrile was crystallized from an ethanol-petroleum ether mixture and had a melting point of about 84–85° C.

*Analysis.*—Calc.: C, 80.74; H, 5.81; N, 13.45. Found: C, 81.23; H, 5.72 N, 12. 67.

Still other compounds employed in the invention can be synthesized according to the procedure of Klosa, Arch. Pharm., 289,177 (1956).

A mixture of a heterocyclic aldehyde, a primary or secondary amine hydrochloride, and potassium cyanide in water is stirred at room temperature for about two hours. The reaction mixture is diluted with water and the basic product extracted with ether. The ether solution is then extracted with 2N hydrochloric acid, forming the salt of the desired product in aqueous solution. By making the aqueous solution basic with concentrated aqueous ammonium hydroxide, the product as the free base can then be extracted into ether, which ether solution can be dried and saturated with dry hydrogen chloride gas, precipitating the hydrochloride salt of the desired product. The salt is then recrystallized from a suitable solvent.

The preparation is more fully illustrated by the following.

Preparation 15.—α-Methylamino-α-(4-pyridyl) acetonitrile dihydrochloride

A mixture of 12.0 g. (0.184 mole) of potassium cyanide, 12.7 g. (0.188 mole) of methylamine hydrochloride, and 16.0 g. (0.152 mole) of 4-pyridinecarboxaldehyde in 50 ml. of water was stirred and then allowed to stand at ambient room temperature for about two hours.

A little water was added to the mixture, and the crude α-methylamino-α-(4-pyridyl)acetonitrile was extracted with ether. The ether solution so obtained was extracted with 2N aqueous hydrochloric acid, thus forming the hydrochloride salt of the desired compound in aqueous solution. The aqueous solution of the amine hydrochloride was then made basic with concentrated aqueous ammonium hydroxide and the free base extracted into ether. The ether solution was dried and saturated with dry hydrogen chloride gas. The precipitated α-methylamino-α-(4-pyridyl)acetonitrile dihydrochloride was filtered off and had a melting point of about 165–166° C. (dec.).

*Analysis.*—Calc.: C, 43.64; H, 5.04; N, 19.09. Found: C, 43.55; H, 5.35; N, 19.01.

I claim:

1. The method of controlling the nematode population in agricultural soils which comprises adding to said soil a nematocidal amount of an α-amino-α-arylacetonitrile having the following formula or an acid addition salt thereof:

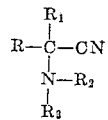

wherein

R is monocyclic aryl or substituted monocyclic aryl;
$R_1$ is hydrogen or $C_1$–$C_4$ alkyl;
$R_2$, when taken separately, is hydrogen or $C_1$–$C_4$ alkyl;
$R_3$, when taken separately, is hydrogen, $C_1$–$C_4$ alkyl, monocyclic aryl, or substituted monocyclic aryl; and
$R_2$ and $R_3$, when taken together with the nitrogen atom to which they are attached, from a morpholino or $C_4$–$C_5$ polymethyleneimino ring.

2. A method as in claim 1 for controlling the nematode population where α-(p-toluidino)phenylacetonitrile is the nematocidal compound.

3. A method as in claim 1 for controlling the nematode population wherein α-dimethylamino-4-methylphenylacetonitrile is the nematocidal compound.

4. A method as in claim 1 for controlling the nematode population wherein α-dimethylamino-4-hydroxyphenylacetonitrile is the nematocidal compound.

5. A method is a claim 1 for controlling the nematode population wherein α-dimethylamino-α-(n-butyl)-4-chlorophenylacetonitrile is the nematocidal compound.

6. A method as in claim 1 for controlling the nematode population wherein α-amino-4-methoxyphenylacetonitrile is the nematocidal compound.

7. The method of inhibiting the growth of fungi in agricultural soils which comprises contacting the fungi with a growth-inhibiting quantity of a fungicidal compound of the following formula or an acid addition salt thereof:

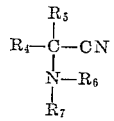

wherein $R_4$ is unsubstituted monocyclic aryl or substituted monocyclic aryl;
$R_5$ is hydrogen when $R_4$ is unsubstituted monocyclic aryl;
$R_5$ is hydrogen or $C_1$–$C_4$ alkyl when $R_4$ is substituted monocyclic aryl;
$R_6$, when taken separately, is hydrogen or $C_1$–$C_4$ alkyl;
$R_7$, when taken separately, is $C_1$–$C_4$ alkyl or monocyclic aryl; and
$R_6$ and $R_7$, when taken together with the nitrogen atom to which they are attached, from a morpholino or $C_4$–$C_5$ polymethyleneimino ring.

8. A method as in claim 7 for inhibiting the growth of fungi wherein α-piperidinophenylacetonitrile is the fungicidal compound.

9. A method as in claim 7 for inhibiting the growth of fungi wherein α-anilinophenylacetonitrile is the fungicidal compound.

10. A method as in claim 7 for inhibiting the growth of fungi wherein α-dimethylamino-α-(2-furyl)acetonitrile is the fungicidal compound.

11. A method as in claim 7 for inhibiting the growth of fungi wherein α-dimethylamino-4-chlorophenylacetonitrile hydrochloride is the fungicidal compound.

(References on following page)

References Cited by the Examiner

UNITED STATES PATENTS

| | | | |
|---|---|---|---|
| 2,268,108 | 12/1941 | Collie et al. | 167—30 |
| 2,823,158 | 2/1958 | Lo | 167—33 |
| 2,870,153 | 1/1959 | Heininger | 167—33 |
| 3,101,340 | 8/1963 | Rorig | 167—33 |
| 3,104,199 | 9/1963 | Langdon et al. | 167—30 |

OTHER REFERENCES

Berichte, vol. 39, pages 986–1013 (1906).
Hauser et al., J. Am. Chem. Soc., vol. 82, pp. 1786–1789 (1960).

ALBERT T. MEYERS, *Primary Examiner.*

JULIAN S. LEVITT, *Examiner.*

D. B. MOYER, G. A. MENTIS, *Assistant Examiners.*